(12) United States Patent
Ivanov (10) Patent No.: US 9,946,409 B2
(45) Date of Patent: Apr. 17, 2018

(54) COMPUTER KEYBOARD WITH INTEGRATED AN ELECTRODE ARRANGEMENT

(75) Inventor: Artem Ivanov, Landshut (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 856 days.

(21) Appl. No.: 13/577,614

(22) PCT Filed: Feb. 10, 2011

(86) PCT No.: PCT/EP2011/000638
§ 371 (c)(1),
(2), (4) Date: Nov. 5, 2012

(87) PCT Pub. No.: WO2011/098280
PCT Pub. Date: Aug. 18, 2011

(65) Prior Publication Data
US 2013/0050092 A1    Feb. 28, 2013

(30) Foreign Application Priority Data
Feb. 10, 2010 (DE) .................. 10 2010 007 698

(51) Int. Cl.
*G06F 3/02* (2006.01)
*G06F 3/048* (2013.01)
(Continued)

(52) U.S. Cl.
CPC .............. *G06F 3/044* (2013.01); *G06F 3/017* (2013.01); *G06F 3/0488* (2013.01); *G06F 3/04883* (2013.01)

(58) Field of Classification Search
CPC ........ G06F 3/017; G06F 3/023; G06F 3/0231; G06F 3/0232; G06F 3/0233;
(Continued)

(56) References Cited

U.S. PATENT DOCUMENTS

| 5,502,460 A | 3/1996 | Bowen ..................... 345/168 |
| 6,204,839 B1 | 3/2001 | Mato, Jr. ................. 345/168 |

(Continued)

FOREIGN PATENT DOCUMENTS

| CN | 1419517 A | * 5/2003 | |
| CN | 101609388 A | 12/2009 | ............. G06F 3/048 |

(Continued)

OTHER PUBLICATIONS

Chinese Office Action, Application No. 201180008868.0, 7 pages, dated Dec. 22, 2014.
(Continued)

*Primary Examiner* — Benjamin C Lee
*Assistant Examiner* — Dong Hui Liang
(74) *Attorney, Agent, or Firm* — Slayden Grubert Beard PLLC (57) ABSTRACT

An input device, especially in the form of a computer keyboard provides which for a user of a computer keyboard special operator benefits result as compared to conventional keyboard systems in association with a pointing device. According to an embodiment, a computer keyboard with a keyboard that includes a multitude of manually operable keys, wherein in this keyboard an electrode arrangement is integrated, is designed in such a way and over a driver circuit exploited in such a way that by means of this electrode arrangement the detection of the spatial position or movement of a finger or a hand in an area in front of the keyboard is made possible in a electrical-field way, and by means of the driver, circuit system signals are provided that have an information content that correlates with position and/or movement of a finger or a hand of the user.

19 Claims, 9 Drawing Sheets (51) Int. Cl.
*G06F 3/0488* (2013.01)
*G06F 3/044* (2006.01)
*G06F 3/01* (2006.01)

(58) Field of Classification Search
CPC .... G06F 3/0234; G06F 3/0235; G06F 3/0236; G06F 3/0237; G06F 3/0238
See application file for complete search history.

(56) References Cited

U.S. PATENT DOCUMENTS

| | | | |
|---|---|---|---|
| 6,680,677 B1 | 1/2004 | Tiphane | 341/22 |
| 6,742,630 B2* | 6/2004 | Eilinger | B66B 1/30 187/290 |
| 8,970,501 B2 | 3/2015 | Hotelling et al. | 345/173 |
| 2002/0030666 A1* | 3/2002 | Philipp | G06F 3/0213 345/168 |
| 2003/0025679 A1* | 2/2003 | Taylor | G06F 3/0414 345/175 |
| 2004/0243747 A1* | 12/2004 | Rekimoto | G06F 3/023 710/72 |
| 2006/0232567 A1 | 10/2006 | Westerman et al. | 345/173 |
| 2008/0042978 A1 | 2/2008 | Perez-noguera | 345/168 |
| 2008/0158172 A1* | 7/2008 | Hotelling | G06F 1/3231 345/173 |
| 2008/0168403 A1 | 7/2008 | Westerman et al. | 715/863 |
| 2008/0284736 A1* | 11/2008 | Trent, Jr. | G06F 3/023 345/168 |
| 2009/0153152 A1* | 6/2009 | Maharyta | G01R 27/2605 324/684 |
| 2009/0225055 A1* | 9/2009 | Oki | G06F 3/044 345/173 |
| 2009/0237361 A1* | 9/2009 | Mosby | G06F 3/04883 345/173 |
| 2009/0284496 A1* | 11/2009 | Oki | G06F 3/0346 345/174 |
| 2009/0293012 A1 | 11/2009 | Alter et al. | 715/810 |
| 2009/0315841 A1 | 12/2009 | Cheng et al. | 345/173 |
| 2010/0148995 A1* | 6/2010 | Elias | G06F 3/0488 341/22 |
| 2011/0074165 A1* | 3/2011 | Grimes | E21B 3/02 290/40 C |
| 2012/0038496 A1* | 2/2012 | Edwards | G06F 3/017 341/34 |
| 2012/0133587 A1* | 5/2012 | Edwards | G06F 3/021 345/168 |

FOREIGN PATENT DOCUMENTS

| | | | | |
|---|---|---|---|---|
| CN | 101632057 A | | 1/2010 | G06F 3/041 |
| CN | 101675206 A | * | 3/2010 | |
| WO | 2008/085418 A2 | | 7/2008 | G06F 3/041 |
| WO | 2011/098280 A1 | | 8/2011 | G06F 3/01 |

OTHER PUBLICATIONS

International Search Report and Written Opinion, Application No. PCT/EP2011/000638, 12 pages, dated Jun. 8, 2011.
Chinese Office Action, Application No. 201180008868.0, 7 pages, dated Nov. 5, 2015.
German Office Action, Application No. 102011010914.5, 4 pages, Nov. 19, 2015.
Wikipedia, "Button," URL: https://de.wikipedia.org/w/index.php?title=Taste&oldid=69824209, 7 pages (w/ English translation), Jan. 26, 2010.
German Office Action, Application No. 102011010914.5, 4 pages, dated Aug. 28, 2015.
Korean Office Action, Application No. 20127021392, 5 pages, dated Oct. 14, 2016.

* cited by examiner

COMPUTER KEYBOARD WITH INTEGRATED AN ELECTRODE ARRANGEMENT

CROSS-REFERENCE TO RELATED APPLICATIONS

This application is a U.S. National Stage Application of International Application No. PCT/EP2011/000638 filed Feb. 10, 2011, which designates the United States of America, and claims priority to German Application No. 10 2010 007 698.8 filed Feb. 10, 2010, the contents of which are hereby incorporated by reference in their entirety.

TECHNICAL FIELD

The invention concerns an input device, in particular in the form of a computer keyboard, that includes a keyboard over which in a per se well-known way by manually pressing keys corresponding keyboard entries can be made.

BACKGROUND

Such computer keyboards are widespread as independent peripheral devices or as integrated input system in case of portable computers, especially notebooks.

Especially for working with graphic user interfaces and using a menu navigation typically implemented here, it is usual to provide, besides a keyboard, also a pointing device like e.g. a computer mouse, a track ball, a graphic tablet or—especially for notebooks—a touch pad. By means of this pointing equipment in a well-known way cursor positions can be manually coordinated. The movements of a cursor correlate with a movement of the mouse, or a movement of a finger on the touch pad.

Pointing equipment typically also includes additional keys or input elements with which determined operations can be carried out, e.g. a left, middle, and right mouse button for selecting elements of the user interface, a scroll wheel, a wheel button and/or additional keys alongside the mouse or a strip on a touch pad, in which a contact and movement of the finger entails a scrolling, as well as special functions provided in the corners of a touch pad. The functions of some or all these additional keys or input elements can be also configured by the user, e.g. special function calls of the operating system if pressing an additional mouse button or if touching a certain corner of the touch pad.

SUMMARY

According to various embodiments, an input device may comprise a keyboard that includes a multitude of manually operable mechanical keys, in which: into this input device an electrode arrangement is integrated, and in which this electrode arrangement is designed and connected to a driver circuit in such a way that by means of this electrode arrangement the detection of the position of a finger or a hand in an area placed in front of the input device is made possible in a electrical-field way, and by means of the driver circuit system signals are provided that have an information content that correlates with position and/or movement of the finger of a user using the input device, without having to touch the input device.

According to a further embodiment, the electrode arrangement may include a group of electrodes. According to a further embodiment, the group of electrodes may include an electrode subgroup that serves for the detection of signals indicative of the position. According to a further embodiment, the electrode group may include a main electrode serving for contact detection. According to a further embodiment, a vertical projection of the observation area defined by the position detection electrodes into the plane of the input device may extend in a contact detection range. According to a further embodiment, the electrode arrangement and the respective driver circuit can be configured in such a way that by them a state to be considered as a mouse click of the input device can be detected and corresponding system signals are generated. According to a further embodiment, the electrode arrangement may include several electrodes arranged in the edge zone of the keyboard, and that these electrodes arranged in the edge zone are used for generating the signals that are indicative for the position of at least one finger or a hand. According to a further embodiment, the system signals generated by the driver circuit can be used for the realization of a gesture-based control. According to a further embodiment, the electrodes can be grouped and arranged in such a way that there is one electrode subgroup primarily for detecting hand or finger movements of the right working hand and one primarily for detecting hand or finger movements of the left working hand. According to a further embodiment, a closing signal indicative for the conclusion of a gesture can be generated by touching a component of the keyboard. According to a further embodiment, a closing signal for a gesture coordinated by a hand can be generated by a contact of the other hand with a keyboard component. According to a further embodiment, the keys can be electrically inoperable or are completely omitted.

According to another embodiment, a computer keyboard can be an input device as described above and a position sensor may be integrated into the keyboard, wherein the spatial axis attribution of the system signals gathered by the electric-field finger detection system is done taking into account the detected spatial orientation of the keyboard by the position sensor.

According to yet another embodiment, a stationary or mobile computer with a display device and a keyboard equipment, in which in the area of the keyboard device an electrode device can be provided for detecting the position of the finger of a user relative to the keyboard, without a contact with the keyboard, and in which the computer is configured in such a way that the progress of an application program used in association with it can be coordinated by the movement of a finger or the hand of the user relative to the keyboard.

According to a further embodiment of the stationary or mobile computer, the electrode device may include several electrode sections provided in the area of the keyboard, that are connected to a sensor circuit, in which by that sensor circuit measuring signals are detected and processed, in which those measuring signals are influenced by the effect of the finger or the hand of the user on the electric-field properties of the environment of the respective electrode sections. According to a further embodiment of the stationary or mobile computer, also in the area of the display device an electrode device can be provided, for detecting the position of a finger of the user in an area placed in front of the display device. According to a further embodiment of the stationary or mobile computer, in the area of the keyboard there can be a contact sensor system, for detecting a signal indicative as a contact with the keyboard or with a physical structure of its surrounding area. According to a further embodiment of the stationary or mobile computer, in the area of the display device there can be a contact sensor system for detecting a signal indicative of a contact with the display device.

BRIEF DESCRIPTION OF THE DRAWINGS

Further particulars and characteristics of various embodiments result from the following description in association with the drawing. The figures show.

DETAILED DESCRIPTION

According to various embodiments, solutions can be created in which for a user of a computer keyboard special operator benefits result as compared to conventional keyboard systems in association with a pointing device.

According to various embodiments, a computer keyboard with a keyboard may include a multitude of manually operable mechanical keys, and in this keyboard an electrode arrangement is integrated, which is designed, sensed and evaluated via a driver circuit in such a manner that by means of this electrode arrangement the detection of the spatial position or movement of a finger or a hand in an area in front of the keyboard is effected by use of an electrical-field, and wherein by means of the driver, circuit system signals are provided that have an information content that correlates with position and/or movement of a finger or a hand of the user.

It is thus advantageously possible to use a keyboard as an interface for gesture-like input operations and especially also to command the cursor in a precise and well coordinated way on a graphic user interface, and also to fulfill additional tasks, without having to remove the hands out of the space above the keyboard for using a pointing device.

Especially in case of particularly compact portable computers, for example netbooks, the avoidance, allowed by the concept according to various embodiments, of a touch pad zone and the compactness obtained in this way prove to be particularly advantageous. It is possible to provide special subroutines for the processing of the signals ascertained according to various embodiments.

For example it is possible to provide control functions by a corresponding driver, which allow an intuitively particularly well manageable application of the technique according to various embodiments. For example it is possible to recognize if both hands of the user are detached from the keyboard. The control program can be oriented in such a way that in this state the gesture-based cursor control function is provided and a gesture-like navigation without contact of the cursor on a display is made possible. As soon as one of the two hands contacts the keyboard again, this cursor control mode is finished.

It is also possible to determine the beginning and the end of the movement of the cursor on the display by pressing one or several keys on the keyboard. These keys can be special keys provided for this function (e.g. mouse button analogously to for example "Scroll Lock", "Num Lock" etc.) or it can be overlapped to the keys already present on the standard keyboard; this superposition of functions can result from the application context (e.g. whenever a character function is called up) or be determined by predetermined keyboard shortcuts possibly configurable by the user (e.g. ALT+C for switching on/out cursor movement, redefinable by a menu).

It is also possible to determine certain areas on the keyboard in which a cursor movement is induced. These areas can be always provided (e.g. visually marked, possibly an area kept free of keys on the keyboard) or can be switched on and off (e.g. by "Num Lock" switching over between cursor keys ("Pos 1" etc.), number pad ("1", "2" etc.) and cursor movement).

It is also possible to recognize the beginning and the end of the cursor movement by certain intention-typical movements of the user, e.g. lifting off all fingertips of a hand from the keys introduces a cursor control, laying down fingertips of both hands finishes the cursor control. This embodiment is especially advantageous for experienced touch typing persons, as they typically have the fingertips (apart from the thumb) of both hands on the keys and lift off only one hand in the middle in order to take the mouse with it and move the pointer. The intention-typical movements can be provided together, in a menu that makes it possible for the user to determine or eliminate the action in case of these intention-typical movements from a set of actions. So for example a left-hander can define that when lifting off the left hand the cursor control is switched on, but when lifting off the right hand no action is started. A right-hander could define that when lifting off the right hand the cursor control is started.

It is also possible to determine gestures by means of which special program functions can be activated. For example it is possible to provide own input gestures for a certain activation of the gesture control. For example a movement of the palm of the hand in the fashion of a beckoning from an upper edge area of the keyboard can cause a pull down of the virtual touch pad over the number pad of the keyboard. When not using this feature, by moving the backs of the fingers towards the upper keyboard edge thus by waving aside, this virtual pad can again be pushed away.

These gestures can also illustrate functions of keys or other input elements that are typically applied on a pointing device, for example the click with the left/right mouse button by fast moving up and down a finger over the left/right input area of the keyboard or a scroll (scroll wheel) by slow movements with the whole hand into X or Y direction above the keyboard. Also a particularly intuitive extension of the range of functions of the display device with further important functions is possible, e.g. augmenting or diminishing a selected object or indicating range by a movement above the keyboard in Z direction.

The keys or further input elements of a pointing device can also be applied partially or in their entirety on the keyboard, e.g. a touch-sensitive strip for scrolling or keys for the function of the mouse buttons.

By the concept according to various embodiments it is possible to create an input device that under inclusion of a technique that can be realized cost-effectively has the advantage that the input device can be well used both by left and right handed persons.

According to an embodiment the keyboard is configured in such a way that the electrode arrangement includes a group of electrodes. This group of electrodes preferably includes an electrode subgroup that serves to detect signals indicative of the position.

The electrode group preferably includes a main electrode serving for contact detection. This main electrode can be designed as a relatively extensive electrode and extend substantially over the total keyboard. This main electrode can be provided with openings, which for example allow the mechanical accessibility of the keys. The main electrode can be realized as a substantially flat metal layer. The main electrode can also be realized in interaction with other components of the keyboard. Especially it is possible to realize the main electrode by a metallic coating of the housing section below the keys of the keyboard, especially also by a metallic coating of the internal area of the keyboard housing. It is also possible to integrate at least some keys into the main electrode. The keys can be metallized for this purpose in the area of their upper side or back side. It is also possible to produce the keys in an electrically conductive material. The metallized, or electrically conductive keys do not have to be necessarily galvanically coupled with the main electrode. It is possible to realize between the main electrode and the keys a certain overlap and thus an electrical-field coupling, so that in the end the field generated by the main electrode can further diffuse over the conductive keys.

According to another embodiment of the electrodes used as position detection electrodes can be arranged in the area of the number pad, or in the area typically used for the arrow keys. The size of this position detection electrodes can substantially correspond to the size of these keys. The position electrodes can be formed especially by these control keys. In this way it is advantageously possible to use the markings provided there anyway for navigation support for the touchless mouse control mode realizable according to various embodiments.

The keyboard according to various embodiments can be formed in such a way that it performs a dynamic allocation of the single electrodes with determined functions. For example it is possible in a primary recognized approach of a hand or a finger to use an electrode group for the precise determination of the position, that makes possible a particularly good triangulation of the finger or hand position. Ideal are electrodes situated with respect to the current finger position in the area of a cone surface the vertically opposed angle of which is in the range 30 to 60°.

According to a particular aspect, the electrode arrangement and the respective driver circuit are configured in such a way that they can detect a state to be considered a touch of the keyboard, and corresponding system signals are generated. This contact can be detected on the basis of certain signal levels and/or certain dynamic characteristics.

The keyboard according to various embodiments can preferably be configured in such a way that a vertical projection of the observation area used for the position detection of a finger in the keyboard plane extends in a contact detection range. In this way it is possible at first to perform a cursor control without contact and to conclude this movement set by lowering and laying down the finger on the keyboard. Various embodiments thus especially concern a system, that makes possible both the detection of a finger movement preliminary to contacting a keyboard and the physical contacting of the keyboard itself. The system makes possible the processing of special gestures that besides a certain spatial course also contain contact phases or are initiated or concluded by them.

The electrode arrangement is preferably configured in such a way that it includes several electrodes arranged in the edge zone of the keyboard, these electrodes arranged in the edge zone being used for generating the signals indicative of the finger position.

The system signals generated by the driver circuit connected to the electrode arrangement are used according to various embodiments for the realization of a gesture-based control. The driver circuit can be formed in such a way that the system signals generated by it exist in a data or signal format usual for computer periphery systems. It is possible to undertake, already in the area of the driver circuit, a relatively extensive signal preprocessing, by which a certain attenuation, scaling and where applicable also certain effects like a ballistic effect are reached. For the rest the X, Y and preferably also Z axis information obtained according to various embodiments by means of an electrode arrangement can be processed by a corresponding background program in the actual computer system. Besides the mere realization of a cursor control, the obtained signals can be evaluated also by a gesture detection program. Gesture interpretation and cursor control can be connected.

According to yet another embodiment the electrodes are grouped and arranged in such a way that one electrode subgroup primarily for detecting hand or finger movements of the right working hand and one primarily for detecting hand or finger movements of the left working hand are provided. The signals each time detected by both these electrode groups can be assigned each to a hand of the user. On the basis of these signals special statements can be made. For example a closing signal indicative for the conclusion of a gesture can be generated by touching a component of the keyboard. Especially in the two-hands detection it is possible that a closing signal for a gesture coordinated by the right hand is generated by a contact of the left hand with a keyboard component.

The driver circuit attached to the electrode arrangement can be formed in such a way that the position detection is done by successively measuring the levels of the voltages which are present at the position detection electrodes. Moreover it is possible to detect the field bridging between the position detection electrodes or the field bridging between the position detection electrodes and the main electrode. This detection can take place especially by voltage or load measurement. The area serving for the spatial detection of the finger position or finger movement can be sized in such a way that it substantially corresponds to the range of motion of the finger in association with a light movement of the hand in the wrist. If the position detection electrodes are arranged as corner electrodes in the area of a number pad of a keyboard, the observation area used for the finger position detection corresponds preferably more or less to a cube with an edge length from 8 to 14 cm. The position resolution is done preferably in the central area and in case of close approach to the keyboard with a greater precision than in the edge zone. It is possible, by a fast stirring movement of the forefinger or middle finger approached up to roughly 5 cm from the keyboard, to induce a cursor centering on the screen and then, by the further finger movement, to perform a corresponding movement of the cursor on the screen. It is possible to perform the cursor control in such a way that, for the cursor movement, finger movements are considered that are carried out in case of a certain Z distance value, thus a sufficiently narrow approach. Movements above a corresponding plane are then disregarded.

Figure 1:
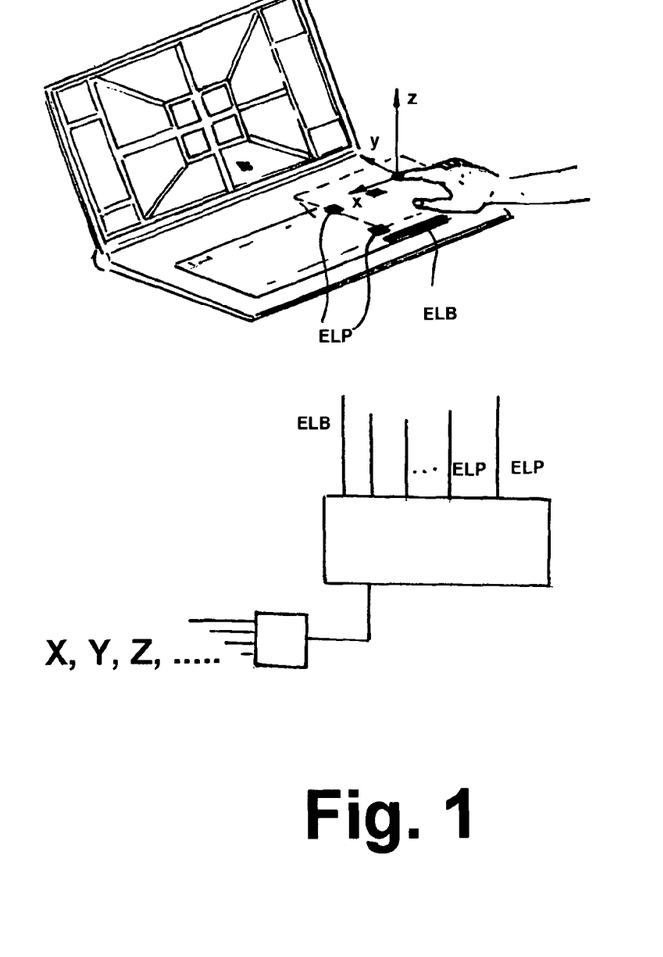
FIG. 1 a perspective view to illustrate the use of various embodiments in a portable computer system.

FIG. 1 shows a notebook computer with a flat display and a keyboard equipment.

In the area of the keyboard device an electrode device is provided for detecting the position of the finger of a user relatively to the keyboard equipment, without the keyboard being touched. The notebook computer is configured in such a way that the progress of an application program used in association with it can be coordinated by the movement of a finger of the user relative to the keyboard.

The electrode device includes several electrode sections provided in the area of the keyboard ELP, ELB that are connected to a sensor circuit, in which by that sensor circuit measuring signals are detected and processed, in which those measuring signals are influenced by the effect of the finger of the user on the electric-field properties of the environment of the respective electrode sections ELP, ELB.

In the embodiment shown here in the area of the flat display device optionally also an electrode device is provided, for detecting the position of a finger of the user in an area in front of the flat display device.

In the area of the keyboard there is a contact sensor system for detecting a signal indicative of a contact with the keyboard or its surrounding area. In the area of the flat display device there is optionally also a contact sensor system, for detecting a signal indicative of a contact with the flat display device.

By the electrode system integrated into the portable computer according to various embodiments it is possible to detect finger movements and approach states of the left and right hand without contact and to command with these detection results the progress of a user program.

Figure 2A:
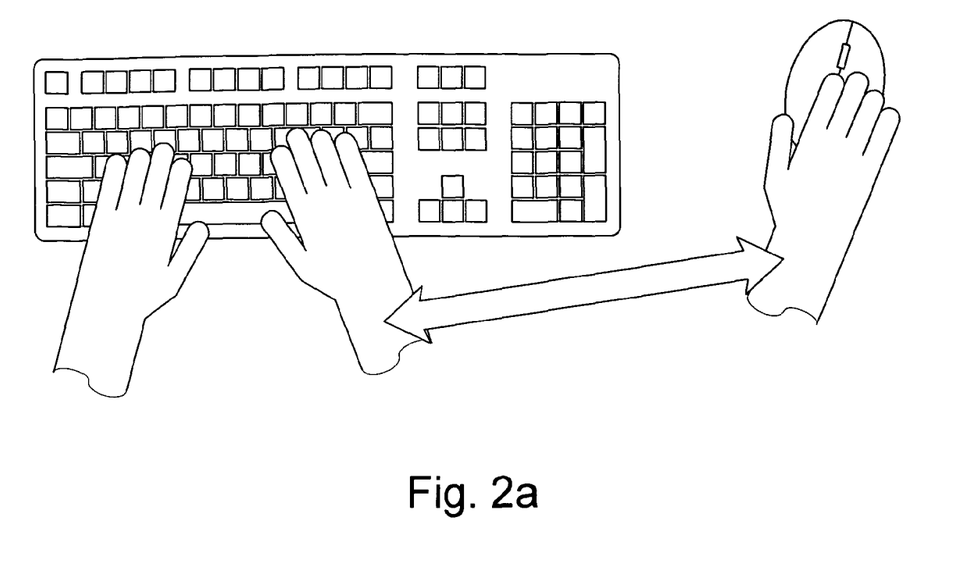
FIG. 2*a* a sketch to illustrate a conventional computer keyboard used by a user in association with a computer mouse.

In FIG. 2a a conventional computer keyboard is illustrated, by means of which in a per se well-known way inputs into a corresponding computer can be done. Such keyboards are used predominantly in association with a computer mouse. By this computer mouse it is possible to carry out a cursor movement correlating with the movement of the mouse.

This approach has proven successful, however it has the disadvantage that the user when using a computer must turn his hand from the keyboard to the mouse (FIG. 2a).

Figure 2B:
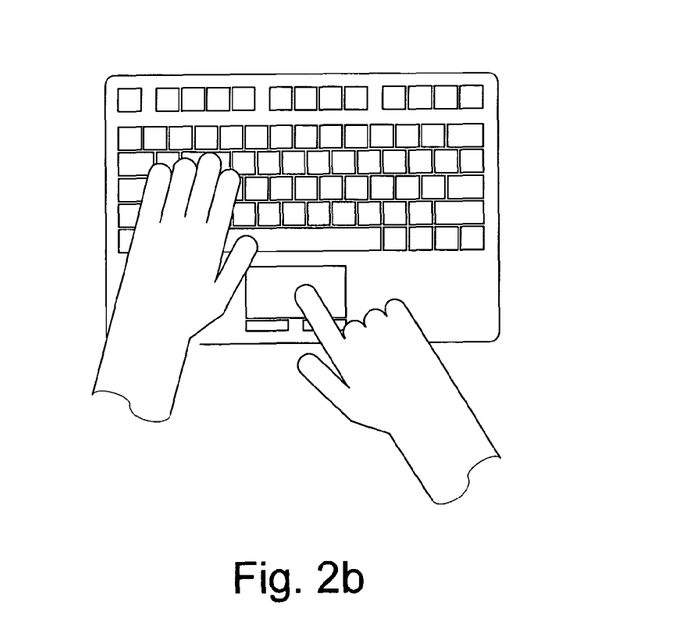
FIG. 2*b* another sketch to illustrate a conventional computer keyboard provided in a notebook computer in association with a touch pad.

In applications like text editor or table editor, in which inputs are mainly done by means of the keyboard and at the same time formattings with the mouse are necessary, this way is not comfortable. Moreover, two devices are necessary for the operation In FIG. 2b a notebook is illustrated that includes an integrated keyboard and a touch pad. By means of the touch pad it is possible to induce cursor movements that correlate with the movement of the finger of a user on the touch pad. This solution is particularly used in notebooks, since no additional devices have to be carried around. Disadvantages of this alternative are a small active surface (for some tasks the operation is too sensitive); moreover space on the surface of the computer is necessary.

Figure 3:
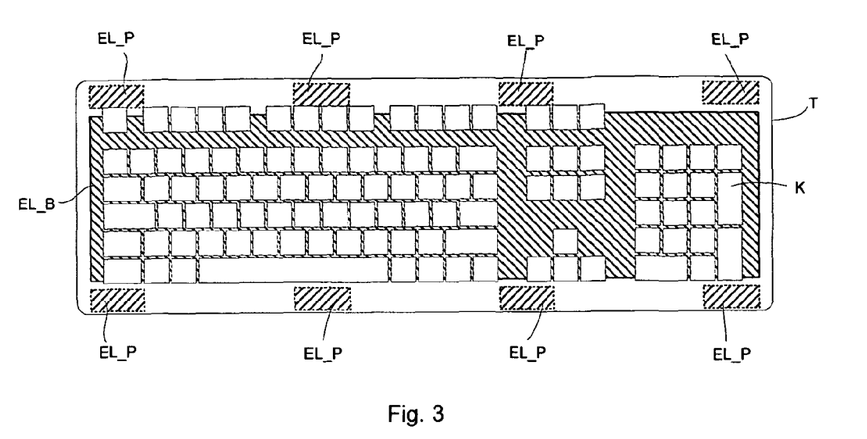
FIG. 3 a schematic representation to illustrate the structure of a computer keyboard according to various embodiments equipped with hand or finger position detection electrodes close to the border, that includes a number pad.

FIG. 3 shows in a highly simplified way a keyboard T configured according to various embodiments that includes several keys K. This keyboard, in an area under the housing surface, is equipped with electrodes, in the following called gesticulation electrodes (outlined by broken lines).

These electrodes are:
(a) the position detection electrodes EL_P on the edge of the keyboard T and
(b) the contact detection electrode EL_B under the keys K.

For a representation simplification purpose all of the electrodes are shown as closed.

However, they can be designed as a grate, a network or a similar locally open structure, in order to procure e.g. necessary space for the key openings. So the contact detection electrode EL_B can be designed as a grate in the free space between the keys. Also in the other illustrations there is this graphic simplification.

The number of the position detection electrodes EL_P can vary; when it is greater (e.g. 8, as illustrated in FIG. 3), the movements of both hands can be registered.

Because of the used technology, i.e. the detection of the position of a finger on the basis of its effect on quasi static electric fields, it is advantageous if the keys K have a possibly flat form, like the keys of notebook keyboards.

The hand position over the coverage area can be translated directly into the screen-coordinates, for example: right lower area of the keyboard corresponds to the right lower area on the screen. Alternative, the deflection of the hand from the center of the coverage area can command the direction and the speed of the mouse pointer movement on the screen, for example: hand over the center of the keyboard causes no movement of the cursor, hand over right lower area of the keyboard moves the cursor downwards to the right with maximum (preset) speed.

An additional advantage results from various embodiments if the keyboard, e.g. in case of notebooks, for space reasons cannot be large. In such portable devices, generally some keys are left away and some keys have more than one function.

Here the various embodiments offer an improvement, on the one hand by the fact, that the space hitherto occupied by the touch pad can be used for the keyboard. Moreover it is possible to reproduce, based on the small "base keyboard" (FIG. 4), the functionality of the full keyboard.

Figure 4:
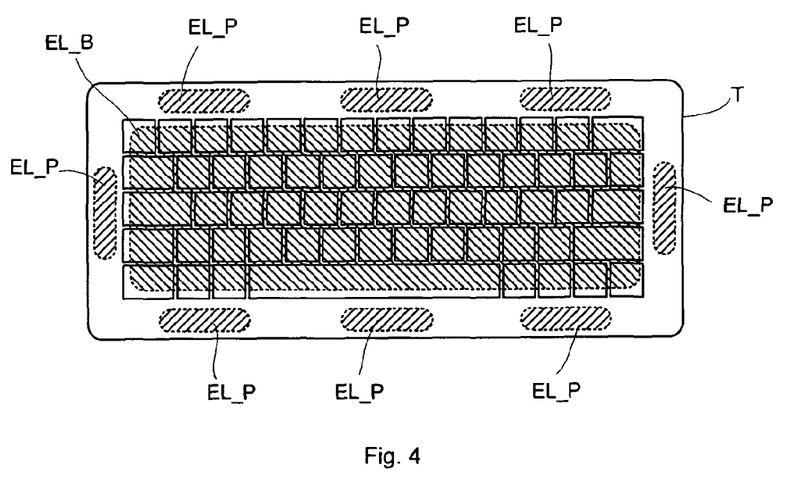
FIG. 4 another schematic representation to illustrate the structure of a computer keyboard according to various embodiments with hand or finger position detection electrodes, without number pad.

The concept according to various embodiments and some examples:

(a) the user moves his right hand over the right edge of the base keyboard from the far right towards the center of the keyboard and with it "brings up" the number pad on the surface of the keyboard; the virtual number pad appears ("enters" from the right) on the screen. Further movements of the right hand of the user move the cursor or alternatively the focus on the virtual number pad. A light touch of the keyboard (without actuating the keys—only touching the surface) can be interpreted by the electronics and the software as typing on the virtual number pad.

(b) the number pad for the left-handers can come from the left side and allows to carry out corresponding inputs with the left hand.

(c) the function keys can be "brought up" from the top.

Various embodiments also allows a completely gesture controlled operation. An important point is that the various embodiments can be used in connection with existing software applications, and by using the various embodiments the user can pass more easily from the former standard operation towards gesture operation.

Various embodiments also offers the additional possibilities of the gesture control of existing system commands, e.g. a movement of the hand from top to bottom over the keyboard minimizes all the windows on the screen; the movement of the hand from the right to the left over the complete keyboard means "switch off computer".

By the concept according to various embodiments it is also possible to ascertain the existence of a hand or both hands of the user on the keyboard or at least near it, even if no keys are pressed. This information can be of interest for processes of the operating system. Especially in wireless keyboards a temporarily sleep mode can be activated, in which special energy saving functions exist.

In FIG. 4 another variant of a computer keyboard—without number pad—is illustrated, which comprises, similarly to the keyboard according to FIG. 3, position detection electrodes close to the border.

Figure 5:
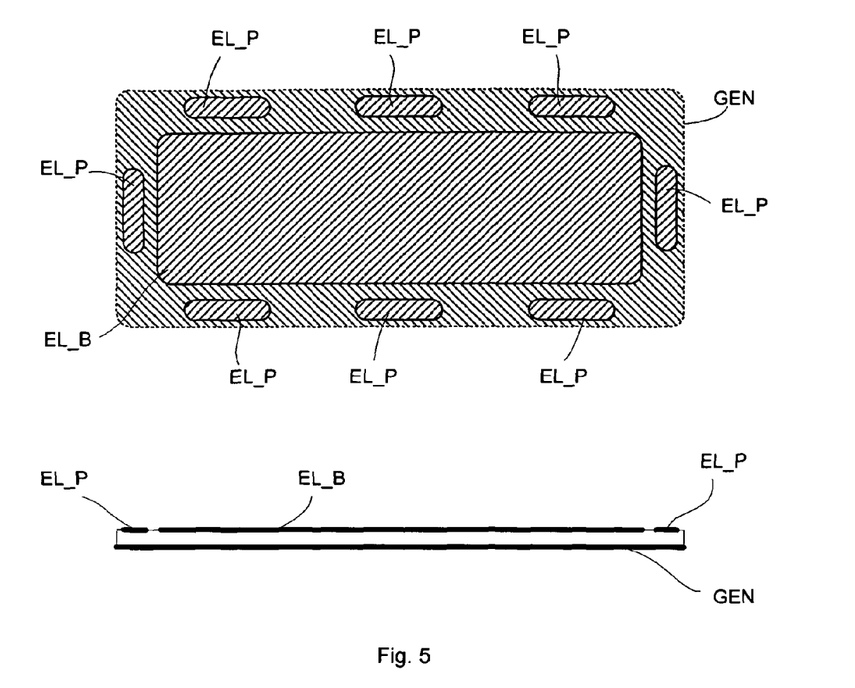
FIG. 5 a schematic representation to illustrate the electrode arrangement of a computer keyboard according to various embodiments, with hand or finger position detection electrodes where the position detection electrodes are situated in the contact detection range.

FIG. 5 shows an electrode arrangement with electrodes applied in 2 layers from both sides on an insulating layer (represented as a slice at the bottom of the illustration). The generator electrode GEN extends under all position detection electrodes EL_P as well as under the contact detection electrode EL_B. The electrodes are connected to the gesture electronics according to FIG. 6.

Figure 6:
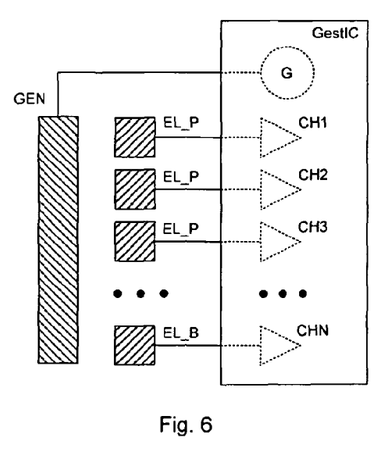
FIG. 6 a sketch to illustrate the connection of the electrodes to a driver or evaluation circuit.
Figure 7:
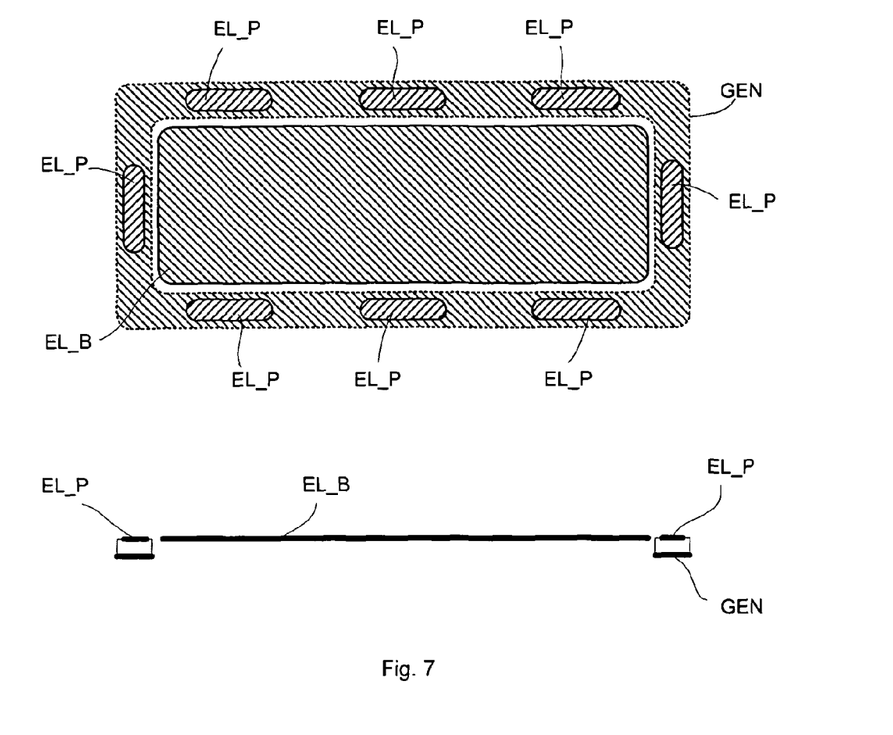
FIG. 7 a schematic representation to illustrate the electrode arrangement of a further variant of a computer keyboard according to various embodiments with hand or finger position detection electrodes.

In FIG. 7 another possible realization of the electrodes is illustrated. In this variant the generator electrode GEN is a frame under the position detection electrodes EL_P. The contact detection electrode EL_B is made in only one layer and can be realized e.g. as a grate between the keys or as a conductive foil with the openings for the key bars. Also the complete metallic coating of the keyboard can be used as EL_B. Such an electrode arrangement can be attached to the gesture electronics in various ways, as it is shown typically in the FIGS. 6, 8, 9, and 10.

Figure 10:
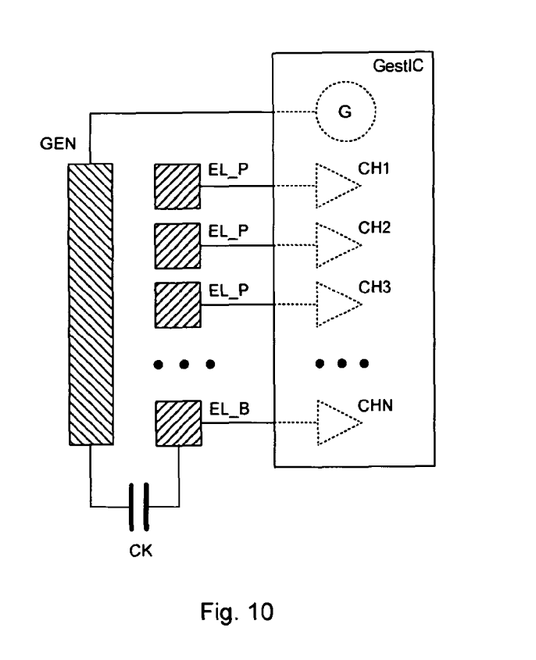
FIG. 10 a schematic representation to illustrate a further variant of the coupling of the electrodes to the driver or evaluation circuit.

FIGS. 6 and 10 show by way of example how the contact detection electrode can be connected to one of the entries of the gesture electronics. This entry does not have to be designed specially for this purpose. FIG. 10 shows the connection possibility by means of a coupling capacitor CK to the "standard" gesture electronics.

Figure 8:
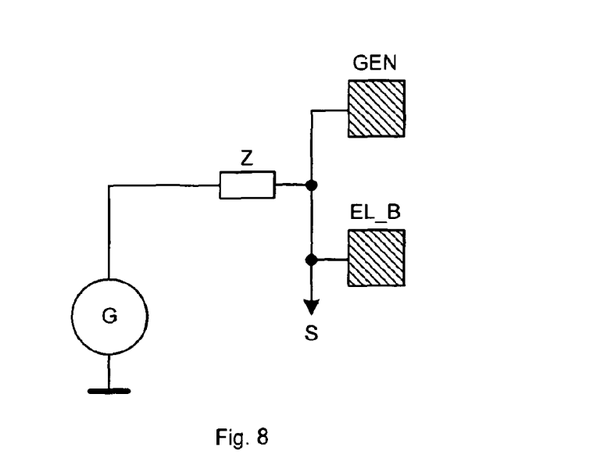
FIG. 8 a circuit sketch to illustrate a first variant of the contact detection with the electrode design according to FIG. 7.
Figure 9:
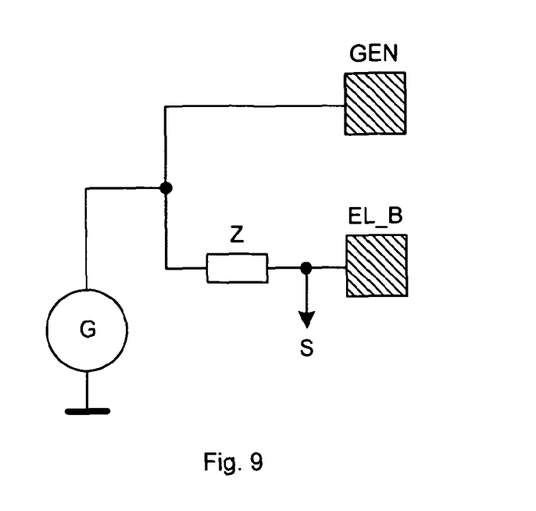
FIG. 9 a circuit sketch to illustrate a second variant for contact detection with the electrode design according to FIG. 7.
Figure 11:
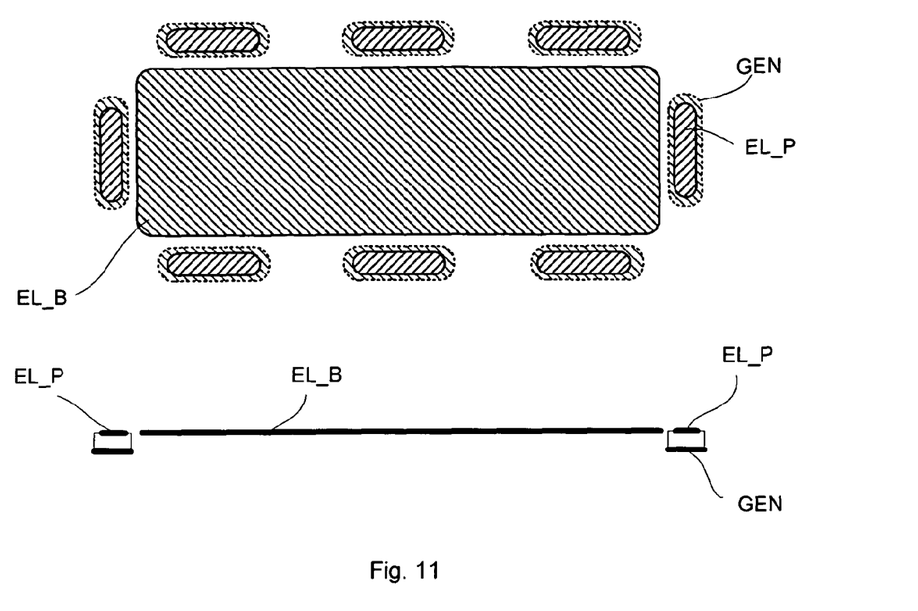
FIG. 11 a schematic representation to illustrate the electrode arrangement of a further variant of a computer keyboard according to various embodiments with hand or finger position detection electrodes.

FIG. 8 and FIG. 9 show this variant with the measurement of the capacitive load at the generator electrode. This can be done for the load C e.g. by measuring the voltage drop at a connection impedance Z connected between the generator G and the generator electrode EL_B (schematically as signal S). This method of detecting the contact can be advantageous as it can be realized with a minor expenditure of electrodes in certain applications. In FIG. 11 an electrode configuration is illustrated in which all of the position detection electrodes EL_P are made as smaller units (tablets) together with the generator electrodes GEN.

Alternatively a distinction between the use of the keyboard and motion detection (mouse function) can take place in the following way: Switching areas are defined on the keyboard, starting from which the device is switched over into the mouse mode (or vice versa). These switching areas (example in FIG. 12 EB1 and EB2) can be defined best over the present electrodes. Their definition can apply for the left hand, for the right hand, or for both hands.

The function of various embodiments is then as follows:

(a) the user works on the keyboard. As long as he does not touch any of the switching areas, no gesture data are evaluated.

Figure 13:
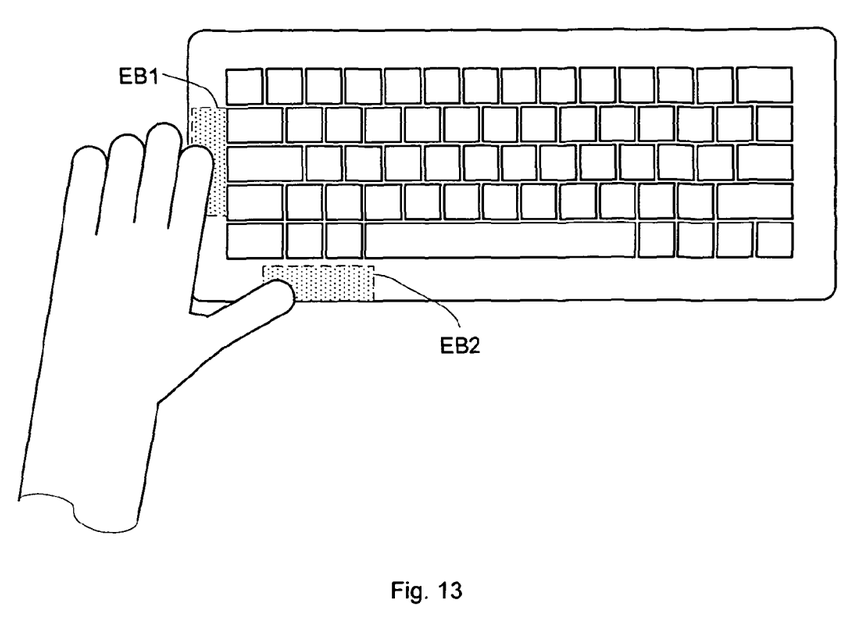
FIG. 13 a schematic representation to illustrate the use of the switching areas.

(b) the user puts his left hand so as to touch one or two of the switching areas with his fingers (FIG. 13). In this moment the movements of his right hand are interpreted as mouse movements, the clicks of the mouse are carried out with touching one or the other switching area.

Figure 12:
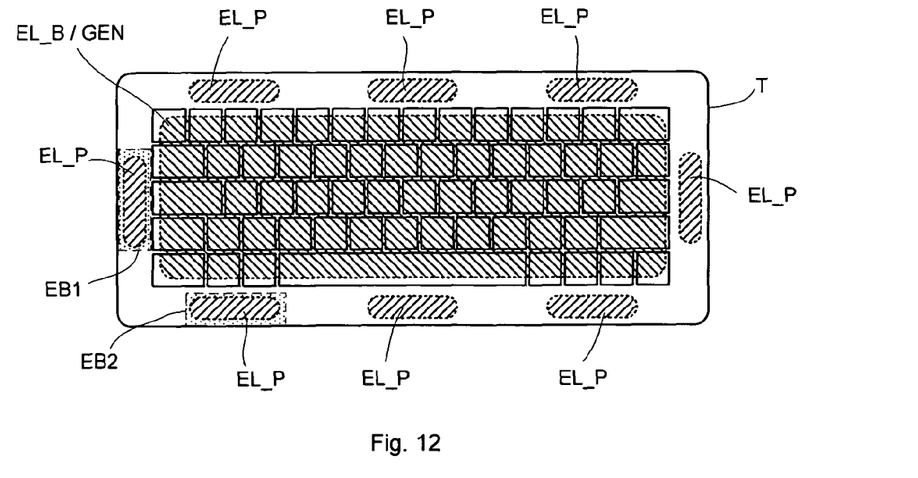
FIG. 12 a schematic representation for the positioning of the switching areas between keyboard and mouse modes.

For this case no contact detection electrode is needed, in its place the generator electrode can be used, as it is marked in FIG. 12 with EL_B/GEN.

Comparable functionalities can take place also with other hand assignments.

A further embodiment of various embodiments as for the detection of clicks in the mouse mode consists in the fact that as soon as the input device is put into this mode, every key actuation at the keyboard is interpreted as a mouse click.

The function of various embodiments is then as follows:

(a) the user works on the keyboard. As long as the mouse mode is not activated, no gesture data are evaluated.

(b) the user activates the mouse mode of the input device in one of the ways described before. From this moment the movements of his hand are interpreted as mouse movements, the clicks of the mouse are carried out with the actuation of any keyboard key that in that moment is under his finger or hand. For this case no contact detection electrode is needed, in its place the generator electrode can be used, as this is marked in FIG. 12 as EL_B/GEN.

Figure 14:
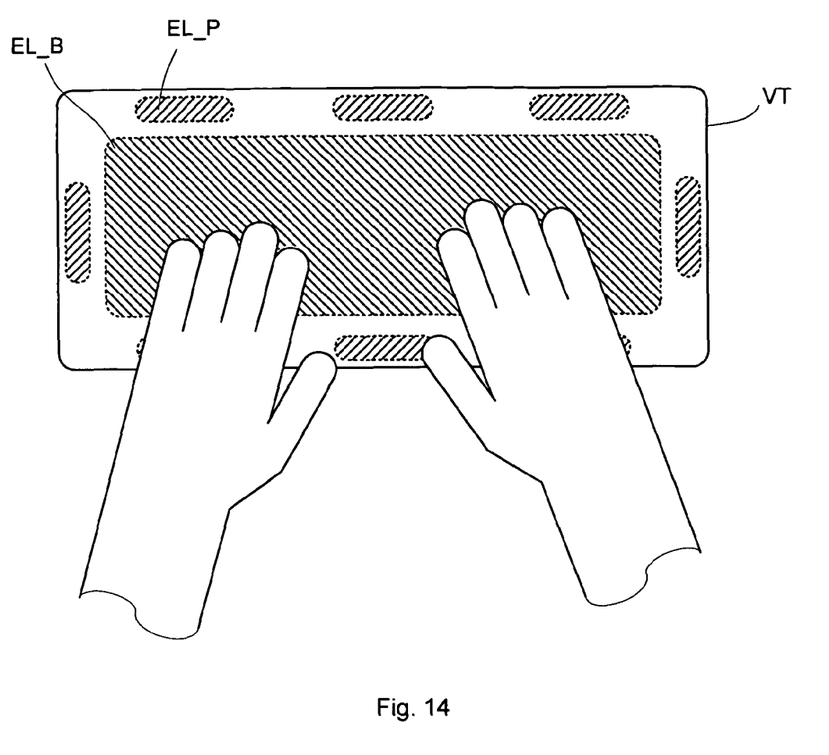
FIG. 14 a schematic representation of a so-called virtual keyboard, in which the keys are electrically inoperable or no more physically present at all and are operated only by means of gestures and contact.

Another field of application of various embodiments is illustrated in FIG. 14. Here a device VT is shown that has no keys and tendentiously looks like an enlarged mouse pad. This device acts as keyboard and pointing device, which is used when using a computer. For the work at the keyboard a virtual keyboard is visualized on the screen (similar to the number pad described before). It may include electrically inoperable keys for generating a tactile feedback. The keys however can also be completely omitted and optionally be printed on the area for orientation. The keyboard can appear as a guidance semitransparent over other applications on the screen or in a (dedicated) partition of the screen; the cursor control is done by gestures as described above. This field can be equipped with a slightly elastic coating. The definitive selection or actuation of a key is done only when exceeding a determined contact pressure or a determined dynamic profile.

The geometries described above of the electrodes are example embodiments. Also other geometries are possible that can differ from them especially in the form and their relative positions of the electrodes.

What is claimed is:

1. Stationary or mobile computer comprising a display device and input device comprising:
   a keyboard that includes a multitude of manually operable mechanical keys, further comprising:

an electrode arrangement integrated within said keyboard and comprising a generator electrode and a plurality of detection electrodes wherein the generator and detection electrodes are arranged separately from the manually operable keys such that the detection electrodes at least partially frame the keyboard, wherein the generator electrode is arranged in a layer below the detection electrodes and covering at least an area covered by said detection electrodes, wherein the generator electrode receives a drive signal and is arranged with respect to the plurality of detection electrodes such that the generator electrode generates a quasi static electrical field extending from the generator electrode above the keyboard to allow detection of a finger or a hand of a user without the keyboard being touched; wherein the detection electrodes are configured to detect the quasi static electric field between a respective detection electrode and the generator electrode;

an evaluation circuit receiving a plurality of signals from said detection electrodes and further configured to detect the position and/or movement of the finger or the hand in the area above the keyboard without touching the input device and being further configured to interpret a gesture made by said finger or hand by evaluating voltage levels received at the detection electrodes.

2. Stationary or mobile computer according to claim 1, wherein the electrode device includes several electrode sections provided in the area of the keyboard and configured to detect the electric field generated by the generator electrode, that are connected to the evaluation circuit configured to measure and process signals received from the several electrode segments, wherein the electric field generated by the generator electrode is influenced by the finger or the hand of the user on the electric-field properties of the environment of the respective electrode sections.

3. Stationary or mobile computer according to claim 2, further comprising in the area of the display device an electrode device for detecting the position of the finger of the user in an area placed in front of the display device.

4. Stationary or mobile computer according to claim 3, wherein in the area of the display device there is a contact sensor system for detecting a signal indicative of a contact with the display device.

5. Stationary or mobile computer according to claim 2, wherein in the area of the keyboard there is a contact sensor system, for detecting a signal indicative as a contact with the keyboard or with a physical structure of its surrounding area.

6. Stationary or mobile computer according to claim 1, further comprising at least one first electrode configured to detect a touch by a user wherein upon detection of a touch at said first electrode the input device is switched from a keyboard mode into a gesture detection mode.

7. Stationary or mobile computer according to claim 1, comprising at least one second electrode configured to detect a touch wherein upon detection of a touch at said second electrode a signal equivalent to a mouse click is generated.

8. Input device with:

a keyboard that includes a multitude of manually operable mechanical keys, further comprising:

an electrode arrangement integrated within said keyboard comprising a generator electrode and a plurality of detection electrodes wherein the detection electrodes form a frame at least partially around the keyboard, wherein the generator electrode arranged in a layer below the detection electrodes and covering at least an area covered by said detection electrodes, wherein the generator electrode receives a drive signal and is arranged with respect to the plurality of detection electrodes such that the generator electrode generates a quasi static electrical field extending from the generator electrode above the keyboard to allow detection of a finger or a hand of a user without the keyboard being touched; wherein the detection electrodes are configured to detect the quasi static electric field between a respective detection electrode and the generator electrode;

an evaluation circuit receiving a plurality of signals from said detection electrodes for detection of the position and/or movement of the finger or the hand in the area above the keyboard without touching the input device and being further configured to interpret a gesture made by said finger or hand by evaluating voltage levels received at the detection electrodes, wherein said detection electrodes detect disturbances in the quasi static electric field generated by the generator electrode.

9. Input device according to claim 8, comprising at least one second contact detection electrode configured to detect the electric field generated by the generator electrode and further configured to detect a touch wherein upon detection of a touch at said second electrode a signal equivalent to a mouse click is generated.

10. Input device according to claim 9, wherein the at least one second contact detection electrode is arranged under and encompassing said multitude of operable keys.

11. Input device according to claim 8, further comprising at least one first contact detection electrode configured to detect the quasi static electric field generated by the generator electrode arranged in a center area of said frame, wherein the at least one first contact detection electrode is formed by a metallic coating of the keyboard.

12. Input device according to claim 11, wherein the generator electrode is ring-shaped and arranged directly under the detection electrodes, and wherein the ring shaped generator electrode is arranged along the edge of the input device.

13. Input device according to claim 8, further comprising at least one first contact detection electrode arranged in a center area of said frame and configured to detect the quasi static electric field generated by the generator electrode and further configured to detect a touch by a user wherein upon detection of a touch at said first contact detection electrode the input device is switched from a keyboard mode into a gesture detection mode or vice versa.

14. Input device according to claim 8, further comprising at least one first contact detection electrode configured to detect the quasi static electric field generated by the generator electrode arranged in a center area of said frame, wherein the at least one first contact detection electrode is designed as a grate in a free space around the keys.

15. Input device according to claim 8, wherein the evaluation circuit is configured to generate signals to initiate the showing of a keyboard, a numerical keyboard, or function keys on a screen associated with said input device.

16. Input device according to claim 8, wherein the detection electrodes are grouped and arranged in such a way that there is one electrode subgroup primarily for detecting hand or finger movements of the right working hand and one primarily for detecting hand or finger movements of the left working hand.

17. Input device according to claim 8, wherein a closing signal indicative for the conclusion of a gesture is generated by touching a component of the keyboard.

18. Input device according to claim 8, wherein a closing signal for a gesture coordinated by a hand is generated by a contact of the other hand with a keyboard component.

19. Input device according to claim 8, wherein the manually operable keys are electrically inoperable.

\* \* \* \* \*